United States Patent

Perez

[15] 3,675,441
[45] July 11, 1972

[54] TWO STAGE REFRIGERATION PLANT HAVING A PLURALITY OF FIRST STAGE REFRIGERATION SYSTEMS

[72] Inventor: Arthur Perez, Niles, Mich.
[73] Assignee: Clark Equipment Company
[22] Filed: Nov. 19, 1970
[21] Appl. No.: 91,041

[52] U.S. Cl. ................................62/278, 62/333, 62/434, 62/510
[51] Int. Cl. ....................................F25b 47/00
[58] Field of Search................62/185, 430, 431, 432, 434, 62/435, 436, 278, 333, 510

[56] References Cited

UNITED STATES PATENTS

| | | | |
|---|---|---|---|
| 1,819,510 | 8/1931 | Hebeler | 62/435 X |
| 2,237,304 | 4/1941 | Greenlee | 62/185 X |
| 2,568,711 | 9/1951 | Bosi | 62/219 X |
| 3,111,819 | 11/1963 | Williams | 62/513 X |
| 3,267,689 | 8/1966 | Liebert | 62/282 X |
| 3,415,071 | 12/1968 | Kompelien | 62/181 X |

Primary Examiner—William F. O'Dea
Assistant Examiner—P. D. Ferguson
Attorney—Kenneth C. Witt, John C. Wiessler, Robert H. Johnson and Lewis J. Lamm

[57] ABSTRACT

This is a two stage refrigeration plant consisting of a plurality of first stage change of phase refrigeration systems and one or more second stage liquid coolant circulation systems interconnected by heat exchange systems. One heat exchange system transfers heat from the brine or other liquid coolant circulating through one or more of the liquid coolant chilling elements in the second stage to the refrigerant in one or more of the evaporators of the first stage to thereby chill the liquid coolant and cool the associated space cooling elements. Another heat exchange system transfers heat from the hot refrigerant gas flowing between the compressor and condenser in one or more of the first stage refrigeration systems to the brine or other liquid in one or more of the second stage liquid coolant circulation systems to heat the liquid and thereby permit defrosting of the associated space cooling elements. One or more of the first stage refrigeration systems may be operated selectively at their most efficient capacity to satisfy the cooling requirements of one or more of the second stage liquid coolant circulation systems.

3 Claims, 1 Drawing Figure

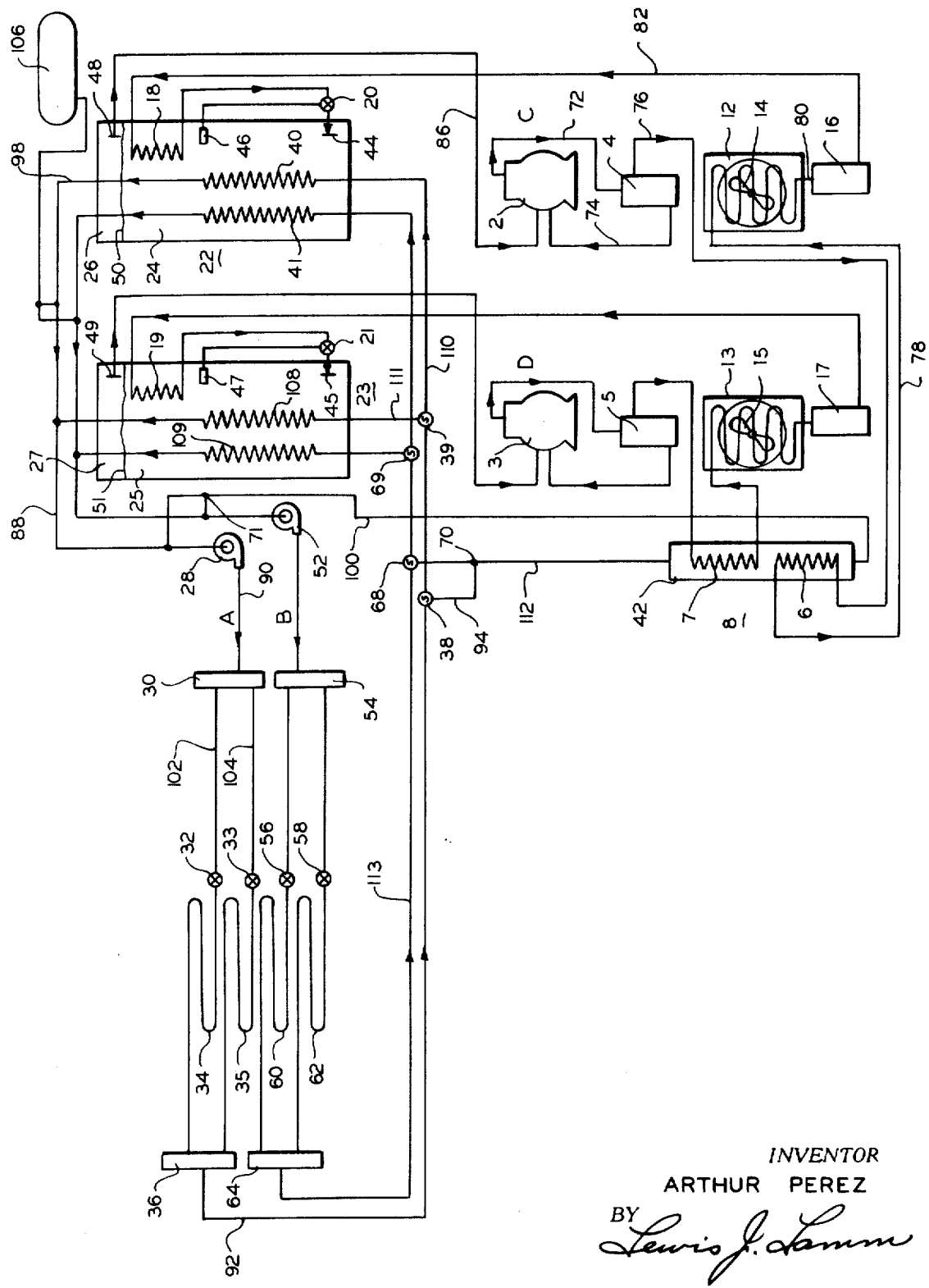

TWO STAGE REFRIGERATION PLANT HAVING A PLURALITY OF FIRST STAGE REFRIGERATION SYSTEMS

BACKGROUND AND SUMMARY OF THE INVENTION

This invention relates to two stage refrigeration plants having a multiplicity of first stage change of phase refrigeration systems and at least one second stage liquid coolant circulation system.

In the present invention, there is a multiplicity of first stage refrigeration systems and one or more second stage liquid coolant circulation systems with heat exchangers between the first stage refrigeration systems and the second stage liquid coolant circulation systems.

The first of these heat exchange systems is used to chill the liquid coolant in one or more of the second stage systems using the evaporators of one or more of the first stage refrigeration systems. The second of these heat exchangers is used to heat the liquid coolant in one or more of the second stage systems using the hot gas coils in one or more of the first stage systems.

The present invention provides for selectively heating or cooling of the second stage liquid coolant utilizing one or more of the first stage refrigeration systems with a minimum of interference with the operation of the refrigeration plant. My copending U.S. application, Ser. No. 91,040, filed Nov. 19, 1970, is directed to a refrigeration plant having a single first stage refrigeration system and one or more second stage refrigeration systems with two heat exchangers. The two heat exchangers permit selective heating or cooling of the liquid coolant in the second stage.

Representative of the closest known prior art is the following reference material:

U.S. Pat. No. 2,072,225—E. M. Post, Jr., discloses a two stage refrigeration plane in which the first stage is a change of phase refrigeration system and the second stage is a liquid coolant circulation system and one in which these two stages are connected by liquid coolant chilling units.

U.S. Pat. No. 3,513,664—Duffney shows a refrigeration system with a plurality of refrigerant compressors operating in parallel and a plurality of evaporators operating in parallel. This patent also illustrates the use of hot gas defrosting.

In the present invention, a multiplicity of change of phase refrigeration systems may be coupled to a multiplicity of liquid coolant circulation systems through a heat transfer system whereby any number of the liquid coolant circulation systems may be connected to any number of the change of phase refrigeration systems in heat transfer relationship while the other systems are left nonoperative.

In the present invention the multiplicity of second stage chilled liquid coolant circulation systems may be in heat transfer relationship with a multiplicity of change of phase refrigeration systems with provision for defrosting one or more of the second stages by redirecting the flow of the brine to a hot gas heat exchanger without otherwise interfering with the operation of either the first or second stage of the refrigerating plant.

In a system utilizing the present invention one of the plurality of second stages may be continued to be operated for cooling purposes while the other of this plurality of second stages may be operated in defrosting stage.

Also in the present invention, one or more of the multiplicity of first stage refrigeration systems may be operated as necessary to provide the necessary refrigeration while the other first stage systems are left dormant.

It is, therefore, an object of the present invention to provide an efficient means for defrosting a two stage refrigeration plant utilizing the hot gases of the first stage of the plant to heat the liquid coolant in a second stage of the plant.

It is another object of the present invention to provide a refrigeration plant having a multiplicity of first stage systems in which any number of these first stage systems may be used to cool the liquid coolant in any number of second stage systems without otherwise interfering with the operation of the refrigeration plant.

It is another object of the present invention to provide a refrigeration plant having a multiplicity of second stage liquid coolant circulation systems any number of which may be selectively defrosted from the heat from any number of the first stage refrigeration systems without interfering with the operation of the plant.

It is a further object of the present invention to provide a two stage refrigeration plant with a maximum of operational flexibility and simplicity.

Further objects of the present invention will become apparent from the inspection of the drawing and specification and will be pointed out in the claims.

BRIEF DESCRIPTION OF THE PREFERRED EMBODIMENT

Referring to FIG. 1, the schematic of a two stage refrigeration plant is illustrated using a plurality of changes of fluid phase refrigeration first stage systems and a plurality of liquid coolant circulation second stage systems.

The refrigeration plant is here shown as including two first stage change of fluid phase refrigeration systems, but in the practice of the invention any number of similar independent systems may be used. Referring to the first of these systems, 2 is a refrigeration gas compressor for compressing freon, $CO_2$, or other change of fluid phase refrigerants. 4 is an oil separator for separating the lubricating oil mist from the refrigerant. 6 is a hot gas heat exchange element which either singularly or in combination with similar hot gas heat exchange element 7 form with the liquid coolant heating element 42 a defroster heat exchanger 8. 12 is a condenser for condensing the gaseous refrigerant into a liquid. 16 is a liquid separator of the common type. 18 is a refrigerant precooler located inside the evaporator 22. 20 is a metering device controlling the flow of liquid refrigerant into the evaporator in accordance with heat transfer demand of the evaporator.

The second of the first stage change of phase refrigeration systems shown as forming part of the refrigeration plant may be identical to, but operates entirely independent of, the first system mentioned above. In this system, 3 is a compressor, and 5 is an oil separator. 7 is the hot gas heat exchange element mentioned above which operates independently of, but cooperative with, heating element 6 to form with liquid coolant heating element 42 the defroster heat exchanger 8. 13 is a condenser for condensing the refrigerant gas into a liquid, while 17 is a liquid separator. 19 is a refrigerant precooler located in the evaporator 23. 21 is a metering device controlling the flow of liquid refrigerant into the evaporator 23 in accordance with heat transfer demands.

The second stage of this refrigeration plant is a liquid coolant circulation system having a multiplicity of liquid coolant circulating circuits. The circulation circuits are all similar to each other. The one identified generally as A has a liquid coolant circulating pump 28, a space cooling element 34, a first selector valve 38, a second selector valve 39, a liquid coolant heating element 42, and liquid coolant chilling elements 40 and 108. The selector valve 38 directs the flow of the brine or other liquid coolant either to the liquid heating element 42 of the defroster heat exchanger 8 or to the second selector valve 39. Selector valve 39 directs the flow of the brine or liquid coolant to either liquid cooling element 40 or liquid cooling element 108 or both. 106 is an expansion tank to maintain the liquid coolant in all of the circulating systems under proper pressure and with an absence of air or other gas occlusions.

The second liquid coolant circulation circuit forming a part of the second stage system of this refrigeration plant includes a pump 52, space cooling elements 60 and 62, a first selector valve 68, a second selector valve 69, liquid coolant heating element 42, a first liquid coolant chilling element 41 and a second liquid coolant chilling element 109 and expansion tank 106.

The first selector valve 68 controls the flow of the liquid coolant selectively to either the liquid coolant heating element 42 or to the second selector valve 69. The second selector valve 69 controls the flow of the liquid coolant selectively to either the liquid coolant chilling element 41, liquid coolant chilling element 109 or to both. The expansion tank 106 is in communication with the second liquid coolant circulation system and performs the same function as it does with the first system, namely, the maintenance of proper pressures and elimination of air or other gas occlusions.

The liquid coolant from both of the second stage systems may be caused to flow either separately or together through the liquid coolant heating element 42 of the defroster heat exchanger 8 to heat the liquid coolant and thus defrost the space cooling elements of either or both of the systems.

The brine or other liquid coolant in one or both of the systems may be placed in heat exchange relationship with one or both of the evaporators 22 or 23, to chill the coolant refrigerant in one or both of the systems by contact with the liquid phase of the change of phase refrigerant contained in the evaporators 22 and/or 23.

SPECIFIC DESCRIPTION OF PREFERRED EMBODIMENT

Referring now to FIG. 1 and more specifically to the two change of fluid phase refrigeration systems which together form stage one of this two stage refrigeration plant. These two refrigeration systems are similar and referred to as the first first stage and the second first stage change of phase refrigeration system.

Compressors 2 and 3 are refrigerant compressors of the type normally used for compressing a common refrigerant such as freon, $CO_2$, etc. These compressors may be hermetic or nonhermetic and also may be of single or multicylinder construction. 4 and 5 are oil separators of the type normally used to remove lubricating oil from the refrigerant and return the oil to the compressor for lubricating purposes.

6 and 7 are hot gas heat exchange elements which include coil elements through which the hot gas flows before it reaches the condenser. These two elements together with a liquid coolant tank element 42 through which the brine or other liquid coolant in the second stage is circulated make up the defroster heat exchanger 8. The purpose of this defroster heat exchanger is to transfer heat from the hot refrigerant gas in elements 6 and 7 to the cold liquid coolant in the tank element 42 to thereby heat the coolant above 32° F. and permit defrosting of the space cooling elements.

12 and 13 are refrigerant condensers of the type capable of condensing the refrigerant hot gas into a refrigerant liquid by cooling the hot gas to below a temperature at which it becomes a liquid. 14 and 15 are thermostatic controlled blowers for cooling associated condensers. 16 and 17 are liquid receivers of the common type which collect the liquid refrigerant from its associated condenser.

Evaporators 22 and 23 in the preferred embodiment of the present invention are of the flooded type with a high volume of liquid 24 and 25 respectively, and a low volume of gas 26 and 27, respectively. Evaporators 22 and 23 may be in the form of pressure tanks with liquid inlets 44 and 45, respectively, and gas outlets 48 and 49, respectively. The rate of liquid refrigerant flow into evaporator 22 through the inlet 44 is controlled by the metering device 20 which in turn is controlled by the thermostatic control element 46. Likewise, the liquid refrigerant flow into evaporator 23 through the inlet 45 is controlled by metering device 21 which in turn is controlled by a thermostatic element 47. These metering devices 20 and 21 may also be controlled by float type liquid level limiting devices. Located inside the evaporators 22 and 23 and below the liquid levels 50 and 51, respectively, are liquid refrigerant precooler coils 18 and 19, respectively, the function of which is to transfer heat from the liquid refrigerant in the precooler coil to the liquid refrigerant in the evaporator. This precools the liquid refrigerant before it enters the evaporator and raises the temperature of the liquid in the top of the evaporator. Also located below the liquid level surface 50 in the evaporator 22 are liquid cooling chilling elements 40 and 41. Element 41 is located in the first of the second stage liquid coolant circulation systems and 41 is located in the second of these systems. Located below the liquid surface 51 in the evaporator 23 are the liquid coolant chilling elements 108 and 109. The liquid coolant chilling element 108 is located in the same second stage liquid coolant circulation system as the chilling element 40 mentioned above and the chilling element 109 is located in the same second stage circuit as is the chilling element 41 mentioned above. The liquid in the second stage may be circulated through either one or both of these coils for cooling the brine which later passes through the space cooling coils. The brine may also be directed through the liquid coolant heating element 42 to raise its temperature for defrosting the space cooling elements.

Referring now to the liquid coolant circulation second stage systems of the refrigerating plant, we have a multiplicity of liquid coolant circulating circuits which share a common defroster heat exchanger 8. In the specific embodiment shown in the drawing, we have shown these two second stage circuits as A and B. The components of circuit A were identified in the brief description of the preferred embodiment above.

The liquid coolant circulating pump in the circuit A and a similar pump 52 in circuit B are illustrated as centrifugal impeller pumps, but they may be piston pumps or any other well known liquid circulating devices.

30 and 54 are headers or plenum chambers having inlets from the pumps and outlets to space cooling elements. 32, 33, 56 and 58 are thermostatically controlled metering devices for controlling the flow of the liquid coolant through associated space cooling element coils 34, 35, 60 and 62, respectively. The outlet ends of the coils 34 and 35 enter a common header 36 while coils 60 and 62 have outlets to a common header 64.

The selector valves 38 and 68 are of the common type manual or power operated three way valves which provide communication from the single inlet to a selected one of the two outlets.

Selector valves 39 and 69 are of the common type manual or power operated three way valves which provide communication between the single inlet and a selected one of the two outlets or between the inlet and both outlets simultaneously.

Liquid coolant chilling elements 40 and 41 are coils which are immersed in the liquid refrigerant in the evaporator 22. Liquid coolant chilling elements 108 and 109 are likewise coils immersed in the liquid refrigerant in the evaporator 23.

The defroster heat exchanger 8 has a liquid coolant heating element 42 in the form of a tank through which the liquid coolant may flow in heat exchange relationship with the hot gas heat exchange elements 6 and 7 each of which is in the form of a coil of tubing immersed in the liquid coolant. The liquid coolant may be heated to a temperature above 32° F. as it passes through this element 42 by heat from the heat exchange elements 6 and 7 either singularly or acting together. The expansion tank 106 serves all of the liquid coolant circuits to maintain proper liquid pressure in these circuits and to prevent the accumulation of occluded air.

OPERATION OF PREFERRED EMBODIMENT

Referring to the figure, the first stage of this refrigeration plant includes a multiplicity of change of phase refrigeration systems. For the sake of simplicity, we have here shown the first stage of the refrigeration plant as including two change of phase refrigeration systems indicated generally as C and D. One or more of these refrigeration systems may be operated to chill the liquid coolant in one or more second stage systems, depending on the cooling demand placed on the second stage systems. Since all of the first stage refrigeration systems operate in a similar manner, the operation of only one of the systems will be described in detail.

Referring now to the first stage refrigeration system shown generally as C, the compressor 2 compresses the relatively low pressure cool refrigerant gas from the supply line 86 into a relatively high pressure hot refrigerant gas and exhausts this gas into the line 72 through which it is carried together with lubricating oil mist to the oil separator 4. Here the lubricating oil mist is separated from the gas refrigerant in a well known manner and the oil is returned through line 64 to the compressor 2 for lubricating purposes.

The hot gas is carried from 4 through line 76 to the coil type hot gas heat exchange element 6 where the gas gives up heat to any brine or other liquid coolant which may be circulating through the element 42. It thereby heats this brine or other liquid coolant to a temperature above 32° F. for defrosting the space cooling elements. The hot gas heat exchange element 7 in the first stage refrigeration system D or a similar hot gas heat exchange element from any of the other of the multiplicity of first stage refrigeration systems included in the plant may cooperate with element 6 to bring the brine up to the desired temperature above 32° F.

The slightly cooler high pressure gas then flow through the line 78 to the condenser 12. Here the hot gas is cooled to a temperature below that which it becomes a liquid while still remaining at the high pressure imposed at the output of the compressor. The rate at which the heat is removed from the hot gas to cause it to change to a liquid varies with the temperature of the air surrounding the coils and with the rate at which the air is circulated across these coils. In one particular embodiment of the invention, the condenser coil 12 is located in the outside atmosphere where the ambient temperature of the air may vary considerably from day to night and extremely between the seasons.

In order to control the heat transfer throughout these varying conditions, a thermostatically controlled fan 14 is utilized. This fan may be thermostatically controlled by the ambient air temperature or by the temperature of the liquid refrigerant leaving the condenser through the line 80. Line 80 carries the liquid refrigerant to the receiver 16 which receives liquid and some occluded gas refrigerant from the condenser and removes the gas. The receiver 16 exhausts the liquid through line 82 to the liquid refrigerant precooler 18 located in the evaporator 22. Here the refrigerant is reduced to a temperature below the temperature at which it entered the precooler and is then exhausted through line 84 to the metering device 20 and thence into the evaporator 22 through the inlet port 44.

The metering device 20 is controlled thermostatically by an element 46 immersed in the liquid 24 of the evaporator. If the temperature of the liquid increases to a magnitude above a predetermined level, more refrigerant is introduced. This metering device 22 may also be controlled by the liquid level 50 without departing from the scope of the present invention. The liquid refrigerant 24 in the evaporator 22 is vaporized by the heat from the liquid coolant chilling elements 40 and 41 and by the heat from the liquid refrigerant precooler 18. This refrigerant vapor or gas 26 is then exhausted through port 48 into line 86 at low pressure. The gas then proceeds back to the compressor through line 86 to start the refrigeration cycle over again.

The use of the hot gas heat exchange element 6 to heat the liquid coolant in the element 42 results in the decrease of the temperature of the hot gas which is exhausted through line 78 to the condenser. This results in the increase of efficiency of condenser 22 since less heat needs to be removed from the gas to change it to a liquid.

Having thus described in detail the operation of the first stage refrigeration system shown generally as C, the operation of the system D which is similar in construction and operation will be described only briefly.

The compressor 3 compresses the low pressure cool refrigerant gas into a high pressure hot refrigerant gas and this, together with lubricating oil mist is carried to the oil separator 5 where the oil mist is removed and returned to the compressor and the hot gas proceeds through the hot gas heat exchange element 7 in the defroster heat exchanger 8. The somewhat cooler high pressure refrigerant gas then proceeds to the condenser 13 where it is reduced in temperature sufficiently for it to become a liquid. The liquid refrigerant is separated from the gas refrigerant and proceeds to the receiver 17. The liquid refrigerant from the receiver 17 then proceeds to the precooler coil 19 and thence through metering device 22 and port 45 into the evaporator 23. The amount of liquid admitted to the evaporator is controlled by metering device 21 which, in turn, may be controlled by thermostatic device 47 or by a float device responsive to liquid level 51. The liquid refrigerant 25 is vaporized by heat transfer from the coils 108, 109 and precooler coil 19 and the resultant gas refrigerant is exhausted from the evaporator through port 49 and returned to the compressor 33 as a cool low pressure gas. The refrigerant cycle is then repeated.

Now, referring to the second stage liquid coolant circulation system, we have illustrated two circulating systems A and B in parallel except for that portion of the circuit including the defroster heat exchanger element 42. Two parallel circuits are shown for illustrative purposes, but the invention contemplates a multiplicity of these circuits. The liquid in each of these circuits is cooled by one or more of the evaporators previously described in connection with the first stage refrigeration systems. The liquid coolant from one or more of these circuits may be selectively circulated through the common defroster heat exchanger to raise the liquid temperature to above 32° F. to thereby defrost the coils of the selected system.

The operation of circuit A will be described in detail, but it is understood that the other parallel circuit operates in the same manner as does the circuit A. The circuit B will then be described briefly to show its interaction with circuit A.

Referring more particularly to circuit A, the circulating pump 28 receives liquid coolant from the line 88 and exhausts it at a higher pressure into line 90 which carries the coolant to the header 30. The header or plenum chamber 30 has a multiplicity of outlets here shown as coolant circulating lines 102 and 104 which have thermostatically controlled metering devices 32 and 33, respectively. These metering devices exhaust liquid coolant into space cooling elements 34 and 35 in accordance with the ambient temperature of the air surrounding these elements, respectively. Space cooling elements exhaust liquid coolant into header 36 and thence through line 92 to a selector valve 38.

The selector valve 38 may be operated so as to permit communication between the line 92 and the line 96 for normal cooling operation or between the line 92 and the line 94 for defrosting.

Assuming it is desired to operate the system A in its refrigeration cycle to thereby cool the coils 34 and 35, the selector valve 38 is placed in a position for communication between line 92 and line 96. The selector valve 39 may be positioned to permit communication between line 96 and line 110 or between 96 and 111 or a third position which would allow communication between line 96 and both lines 110 and 111. The selected position of the valve 39 is chosen dependent on whether first stage system C is operating or first stage D is operating or both. If more than two first stage systems are utilized, additional selector valves similar to 39 may be used to permit the circulation of the liquid coolant through any desired evaporator or group of evaporators. The coolant then proceeds through liquid coolant cooling coils 40 and/or 108 to the lines 98 and 88 and thence back to the inlet of the pump 88. Any air which might have been occluded in the liquid is exhausted to the surge tank 106.

When it is desired to defrost the cooling elements 34 and 35, the selector valve 38 is operated to provide communication between the lines 92 and 94. The brine or other liquid then proceeds through lines 94 and 112 to the liquid coolant heating element 42 of the defroster heat exchanger 8 and thence back through line 100 to line 88 and the inlet of the pump 28. The selector valve 38, having blocked communication to the line 96, only brine which has been heated to above 32° F. by the defroster heat exchanger 8 is circulated through the coils 34 and 35 and they are thus defrosted. After the coils are defrosted, the selector valve 38 is then positioned to provide communication through lines 92 and 96 and the system is then back in the normal cooling cycle.

The liquid coolant circuit B and any others which may be added, are similar to circuit A and may or may not use a common circuit between the junction 70 and the junction 71 which common circuit includes the defroster heat exchanger 8. The selector valve 68 works similar to that described in connection with 38 and 69 works similar to selector valve 39, described previously. The pump 52 of the circuit B pumps the liquid coolant to the plenum chamber 54 and metering valves 56 and 58 to coils 60 and 62, respectively. The liquid coolant then is passed through chamber 64 and line 113 to the selector valve 68. The selector valve 68 selects whether the liquid coolant should pass through the defroster heat exchanger 8 or through the cooling coils. The selector valve 69 selects whether the cooling coil 41 or cooling coil 109 or both shall be used in the cooling of the liquid. The liquid the proceeds back to the inlet of pump 52.

By operating the selector valves 38 and 68 as desired, the space cooling elements of the liquid coolant circulation system may be used for space cooling or defrosted selectively as desired in the most efficient manner and with a minimum of interference with the operation of the refrigeration plant.

By operation of the selector valves 39 and 69, the liquid coolant in the liquid circulation second stage of the refrigeration plant may be cooled by circulation through the evaporator of any of one or more of the first stage systems. This gives a maximum of flexibility and allows the first stage systems to be used singularly or in combination as dictated by cooling requirements and allows one or more of these systems to be shut down for maintenance or repairs. Also, should one or more of the first stage systems become unavoidably inoperative, the other systems can carry the cooling load.

The present invention allows the refrigeration systems to be operated at full capacity and maximum efficiency by reducing the number of systems in operation as the load requirements decrease. When only one first stage refrigeration system is utilized to carry the entire load, an unforeseeable breakdown of the system can result in an extremely high loss in refrigerated material. The use of a single system also results in low efficiency operation when the load requirements are low.

Having thus described the preferred embodiment of the present invention, it will be, of course, understood that various changes may be made in the form, details, arrangements and proportions of the parts without departing from the scope of the invention which consists of the matter shown and described herein and set forth in the appended claims.

I claim:

1. A two stage refrigeration plant having a plurality of first stage change of phase refrigeration systems and at least one second stage liquid coolant circulation system comprising:
 a first first stage change of phase refrigeration system including;
 a change of phase refrigerant,
 a first compressor,
 a first condenser,
 a first evaporator,
 a first high pressure hot gas supply line running from said first compressor to said first condenser,
 a first liquid refrigerant supply line running from said first condenser to said first evaporator,
 a first metering device in said first liquid refrigerant supply line capable of controlling the flow of refrigerant to said first evaporator in accordance with the requirements of said first evaporator,
 a first low pressure supply line running from said first evaporator to said first compressor thereby completing the circulation circuit for said first refrigeration system;
 a second first stage change of phase refrigeration system including;
 a change of phase refrigerant,
 a second compressor,
 a second condenser,
 a second evaporator,
 a second high pressure hot gas supply line running from said second compressor to said second condenser,
 a second liquid refrigerant supply line running from said second condenser to said second evaporator,
 a second metering device in said second liquid refrigerant supply line capable of controlling the flow of refrigerant to said second evaporator in accordance with the requirements of said last mentioned evaporator,
 a second low pressure gas supply line running from said second evaporator to said second compressor thereby completing the refrigerant circulation circuit for said second change of phase refrigeration system,
 a second stage liquid coolant circulation system including;
 a liquid coolant
 a liquid coolant circulation pump,
 a space cooling element,
 a first liquid coolant chilling element in heat transfer relationship with said first evaporator,
 a second liquid coolant chilling element in heat transfer relationship with said second evaporator,
 a selector valve having a liquid coolant inlet and two liquid coolant outlets either or both of which outlets may be selectively placed in communication with said inlet by actuation of said selector valve,
 a first liquid coolant supply line running from said pump to said space cooling element,
 a second liquid coolant supply line running from said space cooling element to said selector valve inlet,
 a third liquid coolant supply line running from the first of said two liquid coolant outlets to said first liquid coolant chilling element,
 a fourth liquid coolant supply line running from the second of said two liquid coolant outlets to said second liquid coolant chilling element,
 a fifth and sixth liquid coolant supply line connecting said first liquid coolant chilling element and said second liquid coolant chilling element respectively to said circulation pump to thereby complete the liquid coolant circulation circuit,
 means for actuating said selector valve to place said second liquid coolant supply line in communication with either or both of said third and fourth liquid coolant supply lines to thereby place one or more of said liquid coolant cooling elements in said liquid coolant circulation system.

2. A two stage refrigeration plant as claimed in claim 1 having: a second second-stage liquid coolant circulation system including:
 a liquid coolant,
 a second liquid coolant circulation pump,
 a second space cooling element,
 a third liquid coolant chilling element in heat transfer relationship with said first evaporator,
 a fourth liquid coolant chilling element in heat transfer relationship with said second evaporator,
 a second selector valve having a liquid coolant inlet and two liquid coolant outlets either or both of which outlets may be selectively placed in communication with said inlet by actuation of said selector valve,
 a seventh liquid coolant supply line running from said second pump to said second space cooling element,
 an eighth liquid coolant supply line running from said second space cooling element to said second selector valve inlet,
 a ninth liquid coolant supply line running from the first of said two liquid coolant outlets in said second selector valve to said third liquid coolant chilling element, a 10th liquid coolant supply line running from the second of said two liquid coolant outlets in said second selector valve to said fourth liquid coolant chilling element, an 11th and 12th liquid coolant supply line connecting said third liquid coolant chilling element and said fourth liquid coolant chilling element respectively to said second circulation pump to thereby complete said second liquid coolant circulation circuit, means for actuating said second selector valve to place said eighth liquid coolant supply line in communication with either or both of said ninth and 10th liquid coolant supply lines to thereby place one or more of said liquid coolant elements in said second liquid coolant circulation system.

3. A two stage refrigeration plant as claimed in claim 1 in which:

each of said first stage change of phase refrigeration systems includes a hot gas heat exchange element located respectively in each of said high pressure hot gas supply lines between each associated compressor and condenser, said second stage liquid coolant circulation system including a liquid coolant heating element, and said hot gas heat exchange elements and said liquid coolant heating element forming a defroster heat exchange system whereby heat may be transferred from each of said hot gas heat exchange elements to said liquid coolant heating element, a second selector valve having an inlet and a first outlet in said second liquid coolant supply line and a second liquid coolant outlet, either of said outlets capable of being selectively placed in communication with said inlet by actuation of said second selector valve, a seventh liquid coolant supply line running from said second outlet to said liquid coolant heating element, and an eighth liquid coolant supply line running from said liquid coolant heating element to said circulation pump to thereby complete the liquid coolant circulation circuit, means for actuating said second selector valve to place said second liquid coolant supply line in communication with said seventh liquid coolant supply line and thereby circulate said liquid coolant through said liquid coolant heating element to thereby defrost said space cooling elements.

* * * * *